US007852200B2

(12) United States Patent
Romanczyk et al.

(10) Patent No.: US 7,852,200 B2
(45) Date of Patent: Dec. 14, 2010

(54) REMOTE SERVICE AUDIBLE ARMING STATE ANNUNCIATION

(75) Inventors: Piotr Romanczyk, Melville, NY (US); Dean Mason, Plainview, NY (US); Steven E. Malone, Farmingdale, NY (US)

(73) Assignee: Honeywell International Inc., Morristown, NJ (US)

( * ) Notice: Subject to any disclaimer, the term of this patent is extended or adjusted under 35 U.S.C. 154(b) by 890 days.

(21) Appl. No.: 11/686,110

(22) Filed: Mar. 14, 2007

(65) Prior Publication Data

US 2008/0224846 A1 Sep. 18, 2008

(51) Int. Cl.
*B60R 25/10* (2006.01)

(52) U.S. Cl. .................... 340/426.15; 340/506; 700/84; 710/15; 710/67

(58) Field of Classification Search ............ 340/426.15, 340/502, 506; 710/1, 5, 15, 67; 700/83, 700/84
See application file for complete search history.

(56) References Cited

U.S. PATENT DOCUMENTS 7,679,503 B2 * 3/2010 Mason et al. ............... 340/506
2002/0005894 A1 1/2002 Foodman et al.
2004/0086091 A1 * 5/2004 Naidoo et al. ................. 379/37
2005/0280529 A1 * 12/2005 Hinkson et al. .......... 340/539.1
2006/0238314 A1 * 10/2006 Minassian et al. ...... 340/426.13
2008/0224846 A1 * 9/2008 Romanczyk et al. ........ 340/502

OTHER PUBLICATIONS

Honeywell ADEMCO LYNXR/LYNXR24 Security System User Guide, Apr. 2004, Honeywell, Syosset, New York, USA.

Honeywell ADEMCO 8132/8132-i/8142/8142-1 Symphony/Symphony-i Advanced User Interface User Guide, Dec. 2002, Honeywell, Syosset, New York, USA.

Tanguy Michotte, European Search Report, Jun. 5, 2009, European Patent Office, The Hague.

* cited by examiner

*Primary Examiner*—Brent Swarthout
(74) *Attorney, Agent, or Firm*—Husch Blackwell Welsh Katz

(57) ABSTRACT

This invention relates to accessing security systems through a communication system such as the Internet, a LAN or a WAN, using a virtual remote keypad application which includes an audio capability to enhance user understanding of the security system's status. The virtual remote keypad application receives status information from the user's security system and audibly announces a change in status to the user.

22 Claims, 4 Drawing Sheets

REMOTE SERVICE AUDIBLE ARMING STATE ANNUNCIATION

FIELD OF THE INVENTION

This invention relates generally to controlling security systems remotely through a communication system, such as the Internet, a Global System for Mobile communications (GSM), or a local or wide area network (LAN) or (WAN). In particular, this invention relates to operating security systems through the communication system using a virtual remote control keypad application which includes an audio capability to enhance user understanding of the security system's status.

BACKGROUND OF THE INVENTION

Security systems are used to monitor homes and businesses to prevent unwanted intrusions as well as to guard against natural disasters. Critical to the operation of such security systems is their arming and disarming. Generally a security system is armed and disarmed using a keypad on a control panel residing within the structure that the system monitors. Traditional keypads can be wired into the system's control panel or can be wireless. In addition, non-traditional, virtual keypad applications providing access to the security system over the Internet, GSMs, LANs or WANs are also available. For example, U.S. patent application Ser. No. 11/705,659, filed Feb. 13, 2007, for "Auto Connect Virtual Keypad" discloses a virtual keypad application, and is incorporated herein by reference.

A traditional keypad's screen display can show only text or can include sophisticated graphics and/or audio responses to user commands. However, at present, security system status information from a virtual remote keypad application has been a text only function.

SUMMARY OF THE INVENTION

The present invention advantageously provides a system having audio capabilities to enable audio responses to user commands for users accessing their security systems using a virtual remote keypad application through a communication system. A virtual remote keypad having audible annunciation will increase a user's awareness of the status of the security system. This virtual remote keypad can be displayed on a display screen. The method for operating a virtual remote keypad of a security system for securing a structure comprises: initiating a virtual remote keypad application and receiving an initial status; receiving a current status; if the current status is not the same as the initial status, audibly announcing the current status and setting the initial status to the current status. In a preferred embodiment, the audible announcement of the status is produced by playing a digital file.

In another embodiment, a method for operating a virtual remote keypad of a security system for securing a structure comprises initializing a virtual remote keypad application and receiving an initial state from a control panel of the security system; simulating the control panel of the security system; and processing a function to perform a state, wherein the function is one of arming and disarming, the state is one of armed and disarmed, and the processing includes at least audibly announcing the state.

The invention also comprises a system for operating a virtual remote keypad of a security system for securing a structure which includes a control panel associated with the security system, the control panel operable to detect one or more events occurring at the security system; a device for displaying the virtual remote keypad; and a virtual remote keypad application receiving an initial state from the control panel, wherein the virtual remote keypad application receives a current state, and if the current state is not the same as the initial state, the virtual remote keypad application audibly announces the current state and sets the initial state to the current state.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution to the need to increase the user's awareness of the status of his security system when the user is not on the premises monitored by the security system is presented.

Figure 1:
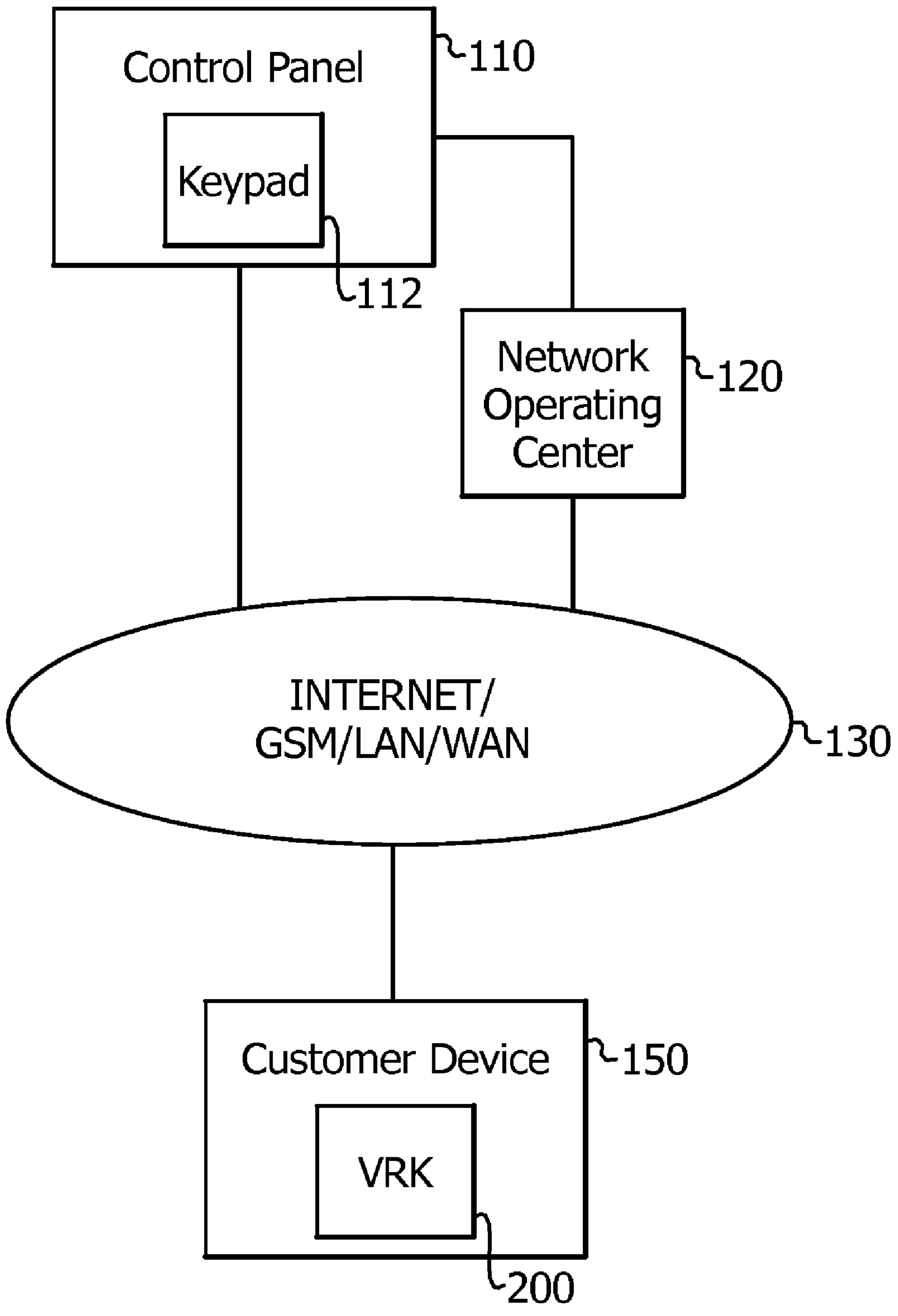
FIG. 1 is a block diagram of an exemplary embodiment of the present invention.

FIG. 1 shows an exemplary embodiment of the invention. A security panel or control panel 110 resides in a home, office or other structure being monitored by a security system. The control panel 110 has a keypad 112 through which the user can arm and disarm the security system. The control panel 110 can be connected to a network operating center (NOC) 120, or can be directly connected to a communication system 130, such as the Internet, GSM, LAN or WAN. In a preferred embodiment, the control panel communicates with the NOC which is connected to the communication system through which information is exchanged with a virtual remote keypad (VRK) application 200. In another embodiment, information can be exchanged directly between the control panel 110 and the VRK application 200 through the communication system 130. The VRK application 200 resides on a consumer device 150. Such consumer devices may include, but are not limited to, mobile phones, such as cellular phones, smart phones, and the like, PDAs (personal digital assistants) and the like, personal computers, laptops, desktop computing devices, etc.

In one embodiment, the VRK application 200 may communicate using WAP (Wireless Application Protocol). WAP is an open international standard for applications that use wireless communication. WAP enables access to the Internet from a mobile phone or PDA. Thus, in this embodiment, the VRK application 200 may communicate with any device, mobile or stationary, that is WAP enabled using, for instance, the Internet. Any communication protocol may be employed to enable the VRK application to communicate with the user's security system.

Figure 2:
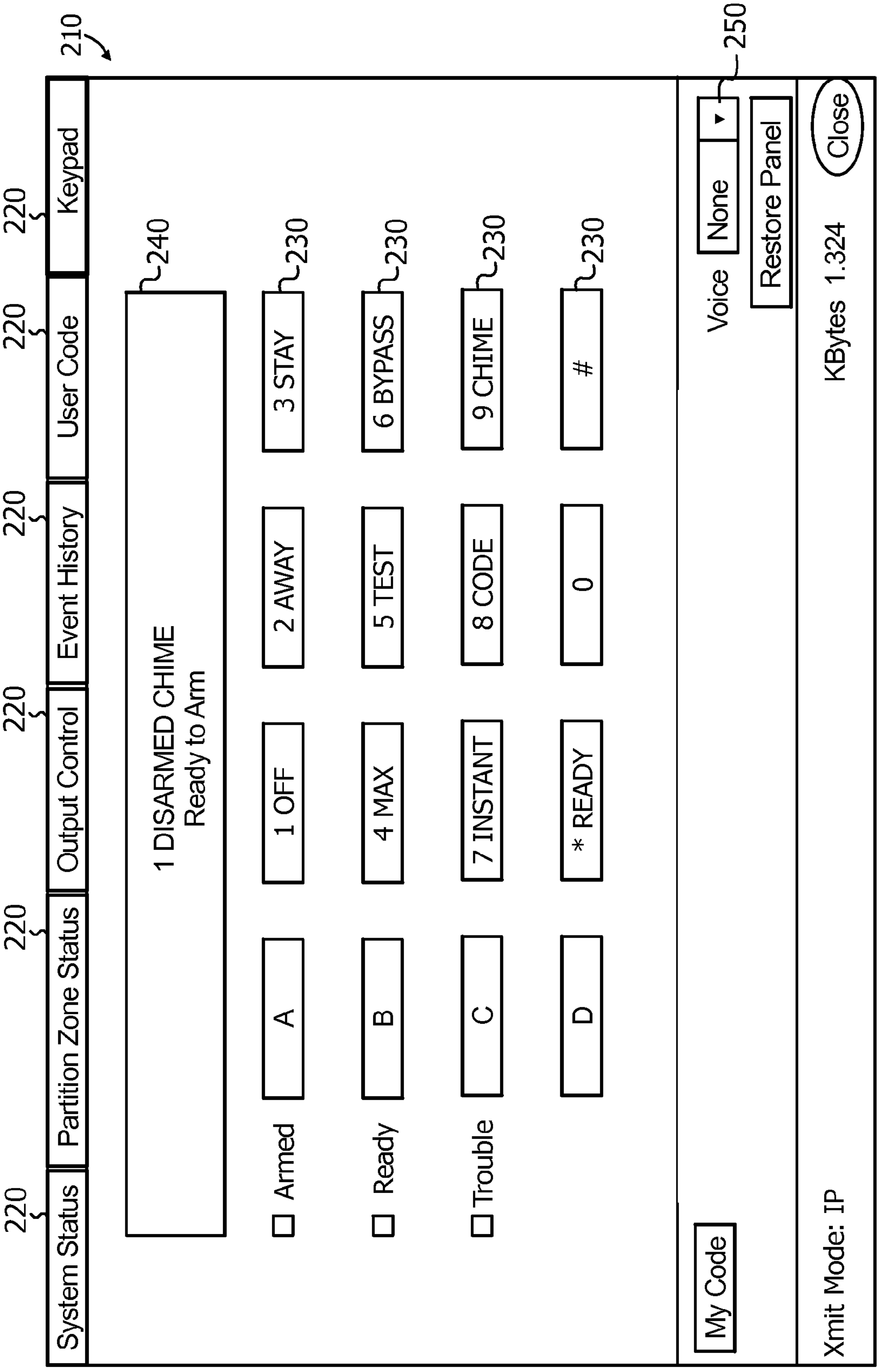
FIG. 2 is a virtual remote keypad in accordance with one embodiment of the present invention.

FIG. 2 shows a control panel of a security system in the form of a VRK screen 210 produced by a VRK application 200 on a consumer device 150 in accordance with one embodiment of the invention. The control panel includes tabs 220 for displaying and controlling various system features and functions. The VRK screen 210 displays buttons 230 which include the traditional telephone keypad buttons as well as four other buttons, similar to a traditional control panel keypad 112. In addition, a panel 240 indicating the status of the security system is displayed. Also, a window 250, which activates a drop down menu, provides the option of selecting a voice or a no voice feature.

One system feature available as a tab 220 on the VRK screen 210 is the Partition Zone Status which displays the status of logical work units or partitions, and the corresponding zones of the partitions. When the control panel is "armed", a partition with its corresponding zones is "armed". Multiple partitions can be armed simultaneously. For example, in a residence, each floor can be a partition having corresponding zones, such that the basement can be one partition, and the first floor can be a second partition having a living zone and a kitchen zone and others. This allows, for instance, a user to arm the basement while the first floor is disarmed.

Figure 3:
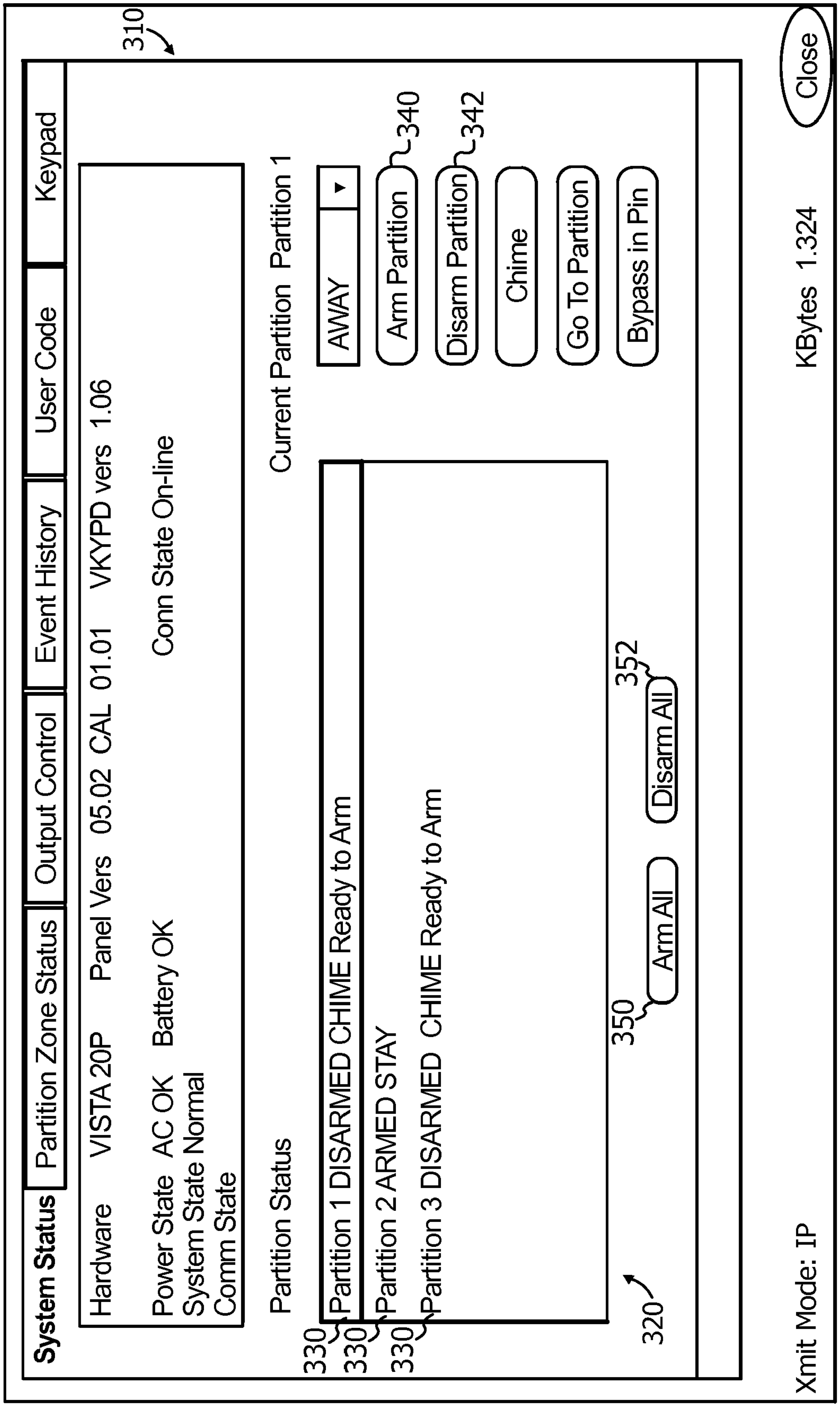
FIG. 3 is a system status screen in accordance with one embodiment of the present invention.

FIG. 3 illustrates the System Status screen 310 feature of the control system. On the System Status screen 310, partition status 320 is displayed in the lower portion of the screen. A user can select a partition by clicking on the desired partition number 330 in this partition status 320. A user can choose to perform various system functions and can modify system states with respect to the selected partition. For example, a user can perform a function of arming or disarming the partition, by clicking on the Arm Partition button 340 or Disarm Partition button 342. Performing these functions causes the control panel to change the state of the system. Further, the user can arm or disarm all partitions simultaneously, by clicking on the Arm All 350 or Disarm All 352 buttons. When a user clicks on any button either arming or disarming one or more partitions, in addition to arming/disarming the security system, a digital file audibly announcing the new state of the system is executed. For example, when the user clicks on the Arm Partition button 340, a file plays "STATE ARMED" on speakers (not shown) coupled to the consumer device 150. The file can be, for example, a wav file or an mp3 file stored on the NOC or the consumer device.

Figure 4:
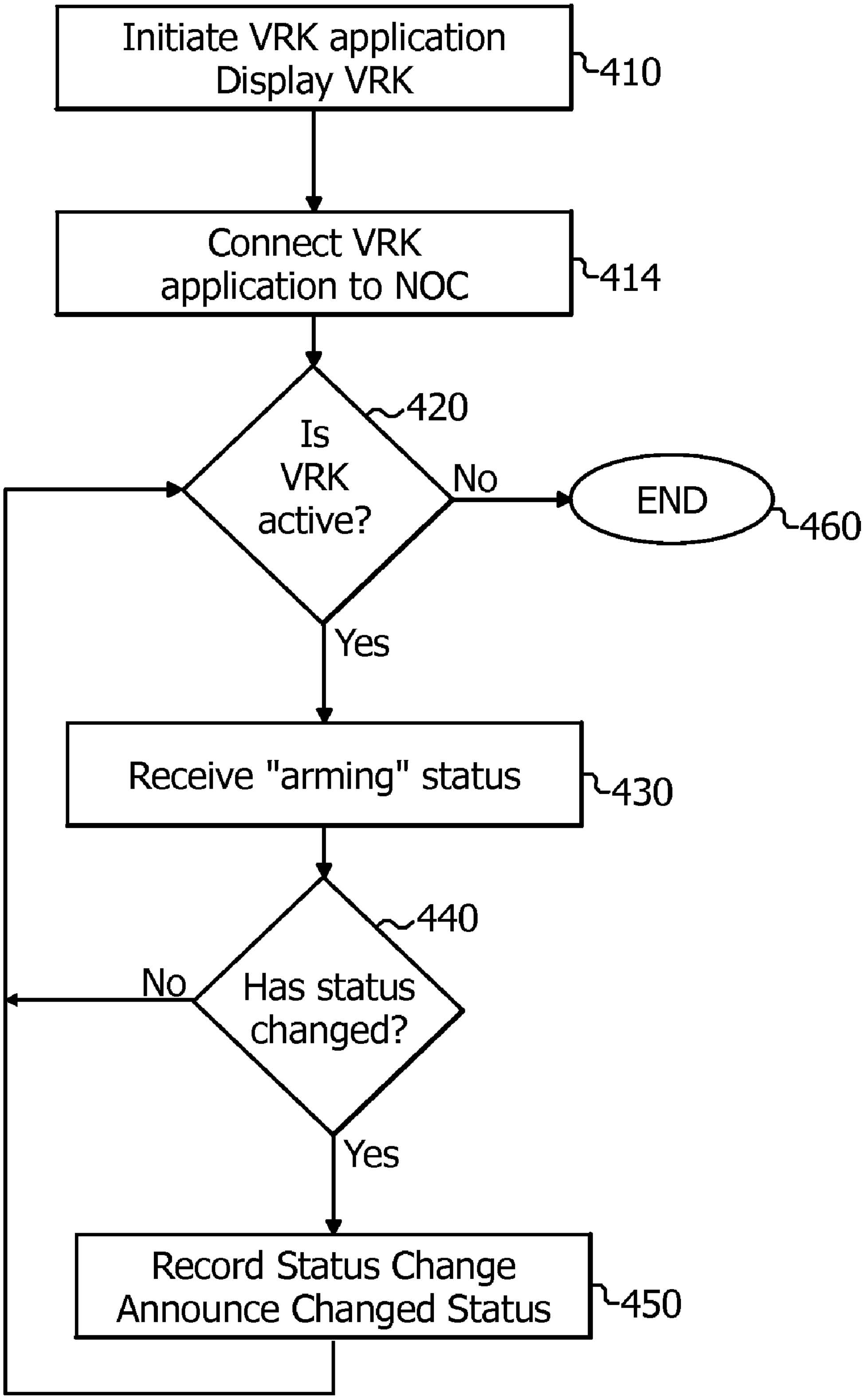
FIG. 4 is a flow diagram illustrating the steps for one embodiment of the present invention.

Operation of one embodiment of the inventive system is described below and illustrated with the steps in the flow diagram shown in FIG. 4. In this embodiment, the user's security system includes a control panel which continually sends its "arming" status to all keypads configured to the panel. In initialization step 410, the user initiates a VRK application 200, and displays the VRK 210 on a consumer device 150. The VRK application connects 414 to a network operating center (NOC) 120, such as Alarmnet®, through a communication system 130 such as the Internet. In this embodiment, the NOC becomes a network router, routing ECP proprietary protocol over TCP. Other protocols could be used. When the VRK application is connected 414 to the NOC, a valid and secure control panel keypad 112 is established so that the VRK is configured to the user's control panel and simulates the user's control panel keypad functions, including allowing the user to arm and disarm the security system or partitions thereof.

After initialization and connection, a check 420 is made to determine whether the VRK application is active and configured with the user's security system. If configured (420=YES), the VRK application parses ECP protocol and receives the arming status 430 being continuously sent by the control panel protocol of the user's security system to all keypads configured with the control panel. The VRK application receives and processes the arming state messages from the control panel in the same way as a traditional keypad configured to the control panel. In addition, the VRK application can generate arming state messages based on user inputs; these messages are transmitted to the control panel and processed accordingly. Thus, arming state messages can be generated not only directly by the control panel but also by a user of the VRK application.

Next, unlike a traditional keypad, the VRK application continues to parse ECP protocol and detects the security events that are audible, such as whether the arming status has changed at 440 since the prior received status. When an arming state difference, or change in arming status, is detected (440=YES), the VRK application downloads the associated mp3 or other digital file from the NOC to the consumer device, and audibly announces the change in arming status by "playing" the digital file at step 450 corresponding to the detected change. For example, a message such as "State Armed" or "Disarmed" is played. The associated digital file can be stored on the consumer device while the VRK application is active.

If no change in the arming state is detected (440=NO), step 420 is performed as discussed above. If the VRK application is no longer active (420=NO), VRK is ended at step 460, and associated mp3 files are deleted from the consumer device.

While the present invention has been described in particular embodiments, it should be appreciated that the present invention should not be construed as limited by such embodiments, but rather construed according to the below claims.

What is claimed is:

1. A method for operating a virtual remote keypad of a security system for securing a structure, comprising:

initiating a virtual remote keypad application on a consumer device;

the consumer device receiving an initial status of the security system from a control panel of the security system;

the consumer device receiving a current status of the security system from the control panel of the security system; and if the current status is not the same as the initial status, setting the initial status to the current status and the consumer device producing an audible announcement of the current status.

2. The method according to claim 1, wherein the audible announcement is produced by playing a digital file.

3. The method according to claim 1, wherein the initial status is received from a control panel of the security system, and the current status is received from one of the control panel and the virtual remote keypad.

4. The method according to claim 1, wherein the initial status is received from a network operating center in communication with a control panel of the security system, and the current status is received from one of the network operating center and the virtual remote keypad.

5. The method according to claim 1, further comprising:

displaying said virtual remote keypad on a display screen.

6. The method according to claim 1, wherein the virtual remote keypad simulates a control panel of the security system.

7. A method for operating a virtual remote keypad of a security system for securing a structure, comprising:

initializing a virtual remote keypad application on a consumer device;

the consumer device receiving an initial state of the security system from one of a control panel of the security system and a network operating center in communication with the control panel of the security system;

the consumer device receiving a current state of the security system, armed or disarmed, from one of the control panel of the security system and the network operating center in communication with the control panel of the security system;

displaying a virtual remote keypad screen on the consumer device; and if the current status is not the same as the initial status, setting the initial status to the current status and the consumer device producing an audible announcement of the current status.

8. The method according to claim 7, further comprising: displaying said virtual remote keypad on a display screen.

9. The method according to claim 7, wherein the audible announcement is produced by playing a digital file.

10. The method according to claim 7, wherein the function is received from the control panel.

11. The method according to claim 7, wherein the function is received from the network operating center.

12. The method according to claim 7, wherein the function is received from the virtual remote keypad.

13. A system for operating a virtual remote keypad of a security system for securing a structure, comprising:

a control panel associated with the security system, the control panel operable to detect one or more events occurring at the security system;

a network operating center communicating with the control panel;

a device for displaying the virtual remote keypad; and a virtual remote keypad application receiving an initial state from the network operating center, wherein the virtual remote keypad application receives a current state, and if the current state is not the same as the initial state, the virtual remote keypad application audibly announces the current state and sets the initial state to the current state.

14. The system according to claim 13, wherein the current state is received from one of the network operating center and the virtual remote keypad application.

15. The system according to claim 13, wherein the audible announcement is performed by playing a digital file.

16. The system according to claim 13, wherein the virtual remote keypad application simulates the control panel.

17. The system according to claim 13, wherein the current state is one of armed or disarmed.

18. A system for operating a virtual remote keypad of a security system for securing a structure, comprising:

a control panel associated with the security system, the control panel operable to detect one or more events occurring at the security system;

a device for displaying the virtual remote keypad; and a virtual remote keypad application receiving an initial state from the control panel, wherein the virtual remote keypad application receives a current state, and if the current state is not the same as the initial state, the virtual remote keypad application audibly announces the current state and sets the initial state to the current state.

19. The system according to claim 18, wherein the current state is received from one of the control panel and the virtual remote keypad application.

20. The system according to claim 18, wherein the audible announcement is performed by playing a digital file.

21. The system according to claim 18, wherein the virtual remote keypad application simulates the control panel.

22. The system according to claim 18, wherein the current state is one of armed and disarmed.

* * * * *